US012058724B2

(12) United States Patent
Elshafie et al.

(10) Patent No.: US 12,058,724 B2
(45) Date of Patent: Aug. 6, 2024

(54) PHY-LAYER HANDLING OF MULTIPLE RELAYED TRANSPORT BLOCKS BY AN AF/DF-RELAY UE IN SIDELINK

(71) Applicant: QUALCOMM Incorporated, San Diego, CA (US)

(72) Inventors: Ahmed Elshafie, San Diego, CA (US); Wei Yang, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 17/648,459

(22) Filed: Jan. 20, 2022

(65) Prior Publication Data

US 2023/0254887 A1 Aug. 10, 2023

(51) Int. Cl.
*H04W 72/56* (2023.01)
*H04W 72/02* (2009.01)
*H04W 72/0446* (2023.01)
*H04W 72/20* (2023.01)

(52) U.S. Cl.
CPC .......... *H04W 72/56* (2023.01); *H04W 72/02* (2013.01); *H04W 72/0446* (2013.01); *H04W 72/20* (2023.01)

(58) Field of Classification Search
None
See application file for complete search history.

(56) References Cited

U.S. PATENT DOCUMENTS

| | | | | |
|---|---|---|---|---|
| 2014/0056278 A1* | 2/2014 | Marinier | ............. | H04W 72/044 370/330 |
| 2017/0353819 A1* | 12/2017 | Yin | ......................... | H04W 4/70 |
| 2018/0014174 A1* | 1/2018 | Zhou | ..................... | H04W 48/16 |
| 2018/0176891 A1* | 6/2018 | Kim | ...................... | H04L 5/0037 |
| 2019/0342894 A1* | 11/2019 | Yi | ........................ | H04W 72/23 |
| 2021/0036819 A1* | 2/2021 | Nam | .................. | H04L 27/0008 |
| 2021/0400633 A1* | 12/2021 | Ali | ........................ | H04W 72/30 |
| 2022/0021491 A1* | 1/2022 | Zhou | ..................... | H04L 1/1671 |
| 2022/0052788 A1* | 2/2022 | Paladugu | .............. | H04L 1/1893 |
| 2022/0287145 A1* | 9/2022 | Damnjanovic | ....... | H04L 69/324 |
| 2022/0312178 A1* | 9/2022 | Wu | ........................ | H04W 8/005 |
| 2022/0338169 A1* | 10/2022 | Elshafie | ................ | H04W 40/22 |
| 2023/0063048 A1* | 3/2023 | Fu | .......................... | H04W 76/14 |
| 2023/0073469 A1* | 3/2023 | Wang | .................... | H04W 40/22 |
| 2023/0090671 A1* | 3/2023 | Elshafie | ............. | H04B 7/15542 370/329 |
| 2023/0118395 A1* | 4/2023 | Xue | ....................... | H04W 76/14 370/315 |

(Continued)

*Primary Examiner* — Kenny S Lin
(74) *Attorney, Agent, or Firm* — Procopio, Cory, Hargreaves & Savitch

(57) ABSTRACT

A first UE may receive, from a second UE via a first sidelink, a first TB. The first TB may be associated with a first priority. The first UE may receive, from a third UE via a second sidelink, a second TB. The second TB may be associated with a second priority. The first UE may forward the first TB to a fourth UE and the second TB to a fifth UE via physical layer multiplexing over a third sidelink and a fourth sidelink, respectively, based on the first priority and the second priority. To forward the first TB to the fourth UE and the second TB to the fifth UE, the first UE may perform an AF operation or a DF operation.

30 Claims, 11 Drawing Sheets

(56) References Cited

U.S. PATENT DOCUMENTS

| | | | |
|---|---|---|---|
| 2023/0171826 A1* | 6/2023 | Selvanesan | H04W 76/14 |
| | | | 370/310 |
| 2023/0180267 A1* | 6/2023 | Chae | H04L 5/0048 |
| | | | 370/328 |
| 2023/0269800 A1* | 8/2023 | Van Phan | H04L 1/1864 |
| | | | 370/329 |
| 2023/0337299 A1* | 10/2023 | Zhang | H04L 45/66 |
| 2023/0363057 A1* | 11/2023 | Ji | H04W 88/04 |
| 2023/0370152 A1* | 11/2023 | Wang | H04L 5/0048 |
| 2023/0370902 A1* | 11/2023 | Wang | H04W 28/0268 |

* cited by examiner

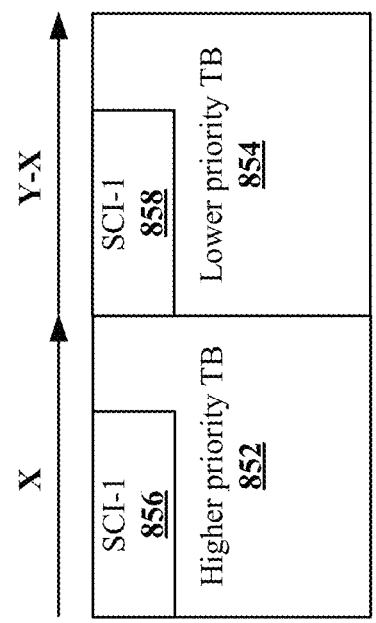
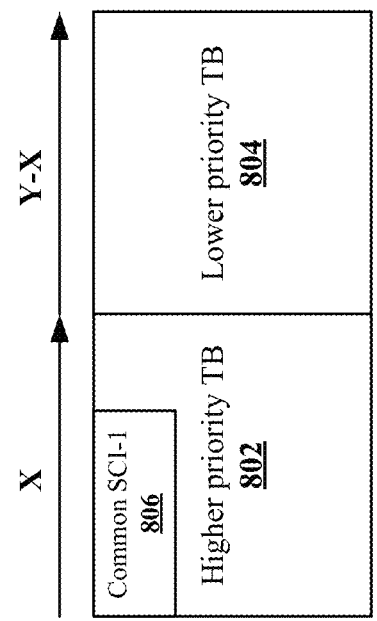
FIG. 8

PHY-LAYER HANDLING OF MULTIPLE RELAYED TRANSPORT BLOCKS BY AN AF/DF-RELAY UE IN SIDELINK

TECHNICAL FIELD

The present disclosure relates generally to communication systems, and more particularly, to a relaying multiple transport blocks (TBs) in sidelink communications.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first user equipment (UE). The apparatus may receive, from a second UE via a first sidelink, a first transport block (TB). The first TB may be associated with a first priority. The apparatus may receive, from a third UE via a second sidelink, a second TB. The second TB may be associated with a second priority. The apparatus may forward the first TB to a fourth UE and the second TB to a fifth UE via physical layer multiplexing over a third sidelink and a fourth sidelink, respectively, based on the first priority and the second priority.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 illustrates example resource allocations for forwarding two TBs and example SCI designs.

DETAILED DESCRIPTION

Figure 1:
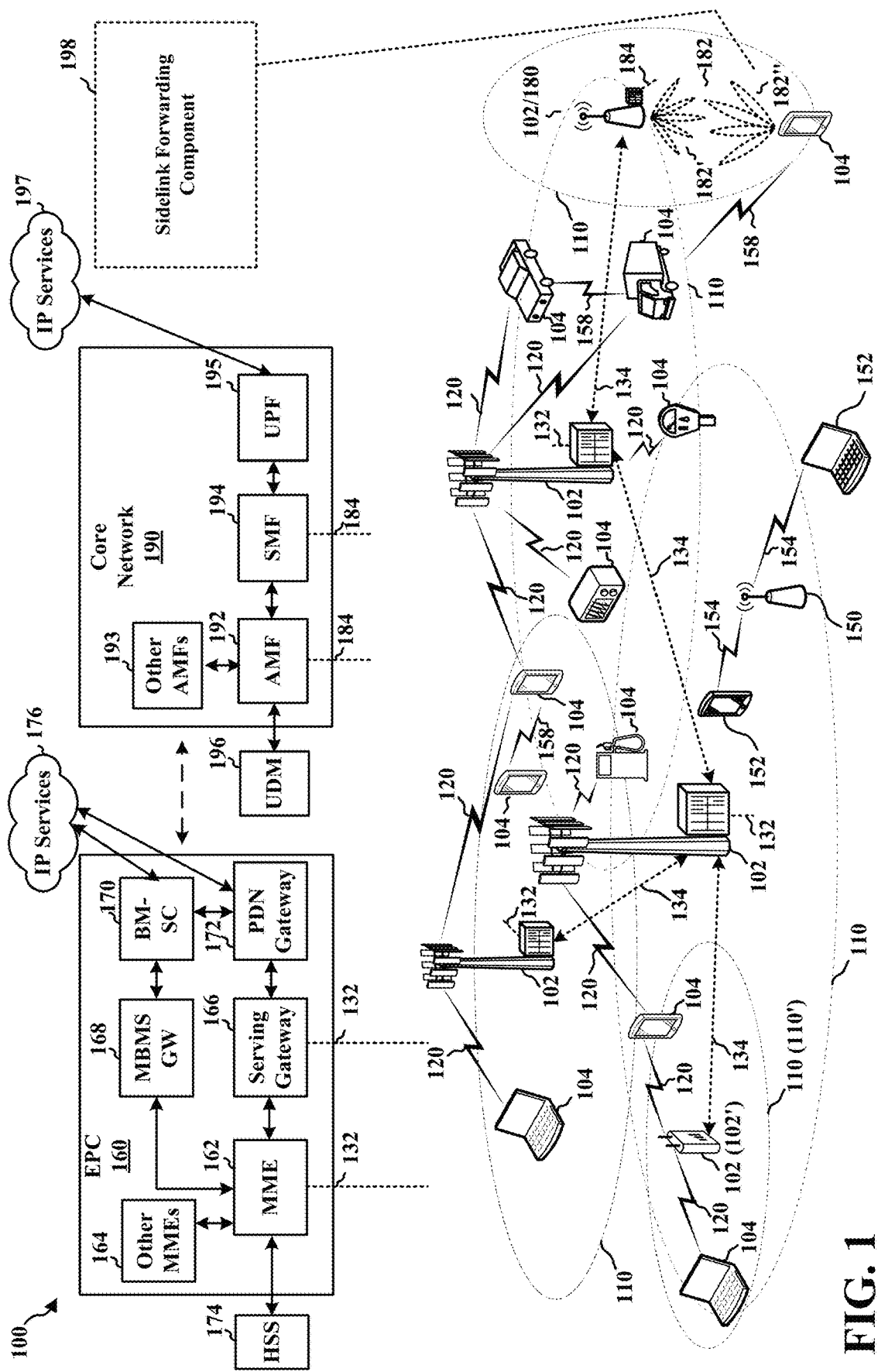
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the first UE 104 may include a sidelink forwarding component 198 that may be configured to receive, from a second UE via a first sidelink, a first TB. The first TB may be associated with a first priority. The sidelink forwarding component 198 may be configured to receive, from a third UE via a second sidelink, a second TB. The second TB may be associated with a second priority. The sidelink forwarding component 198 may be configured to forward the first TB to a fourth UE and the second TB to a fifth UE via physical layer multiplexing over a third sidelink and a fourth sidelink, respectively, based on the first priority and the second priority. Although the following description may be focused on 5G NR, the concepts described herein may be applicable to other similar areas, such as LTE, LTE-A, CDMA, GSM, and other wireless technologies.

Figure 2:
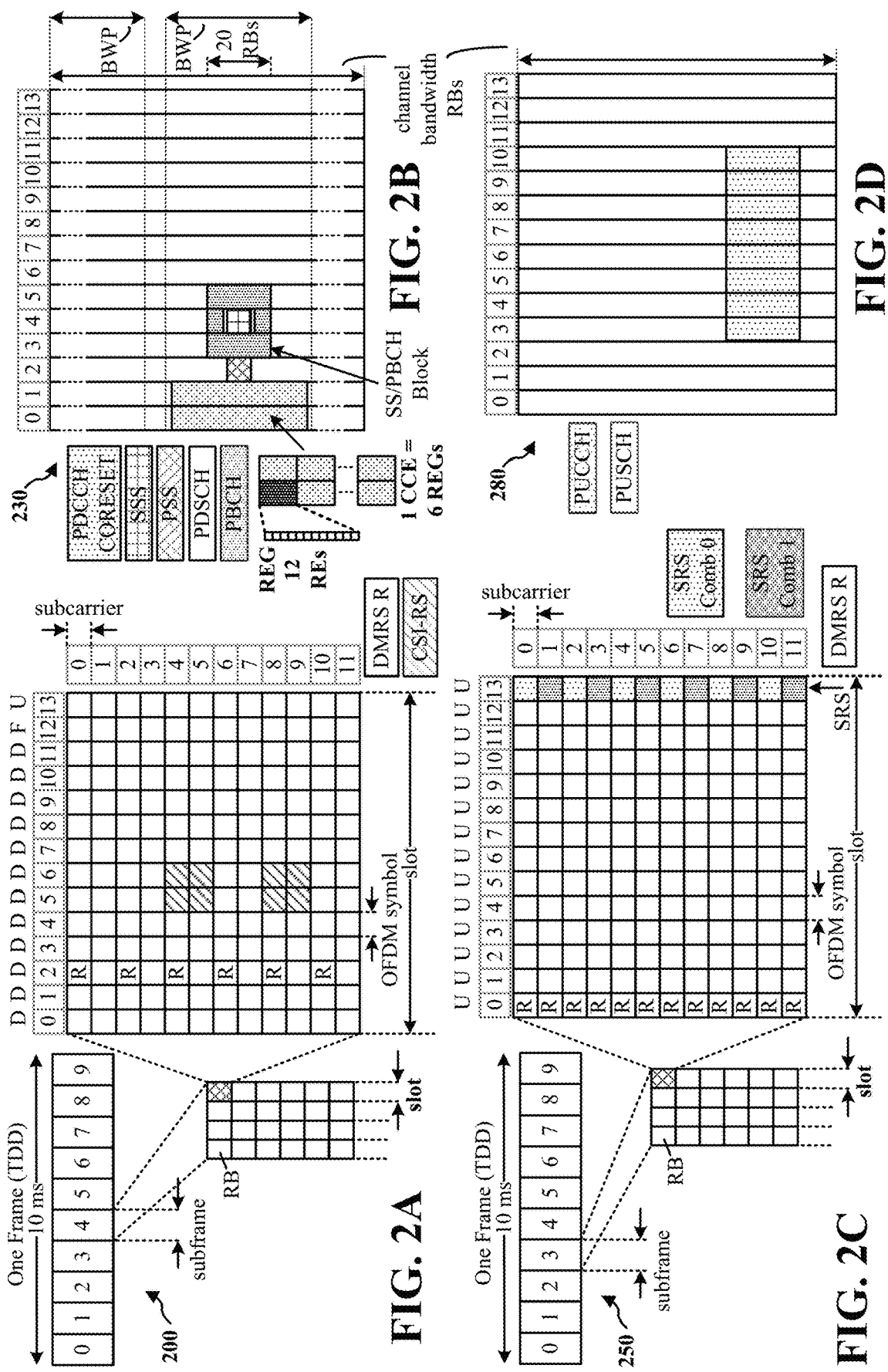
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
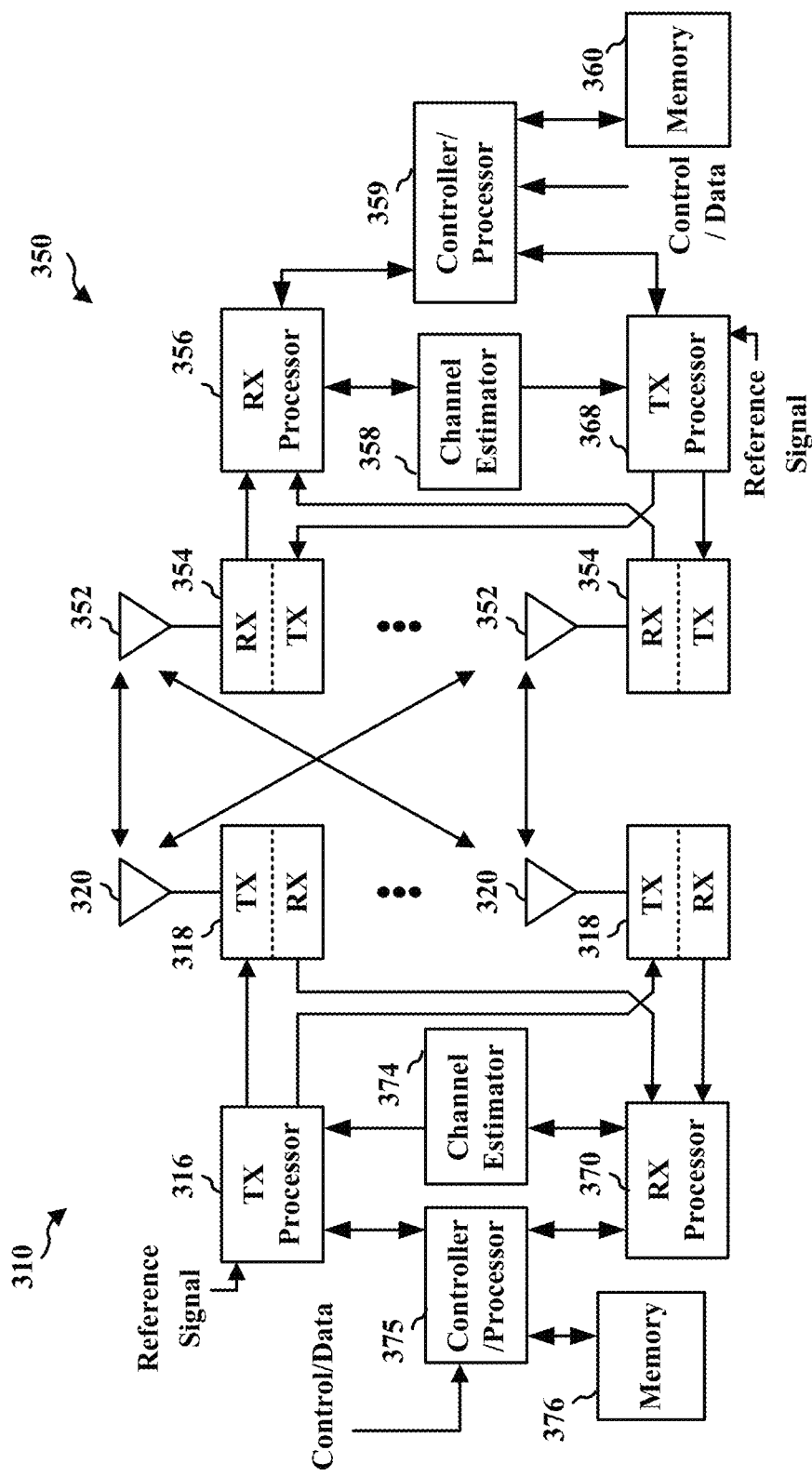
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Figure 4:
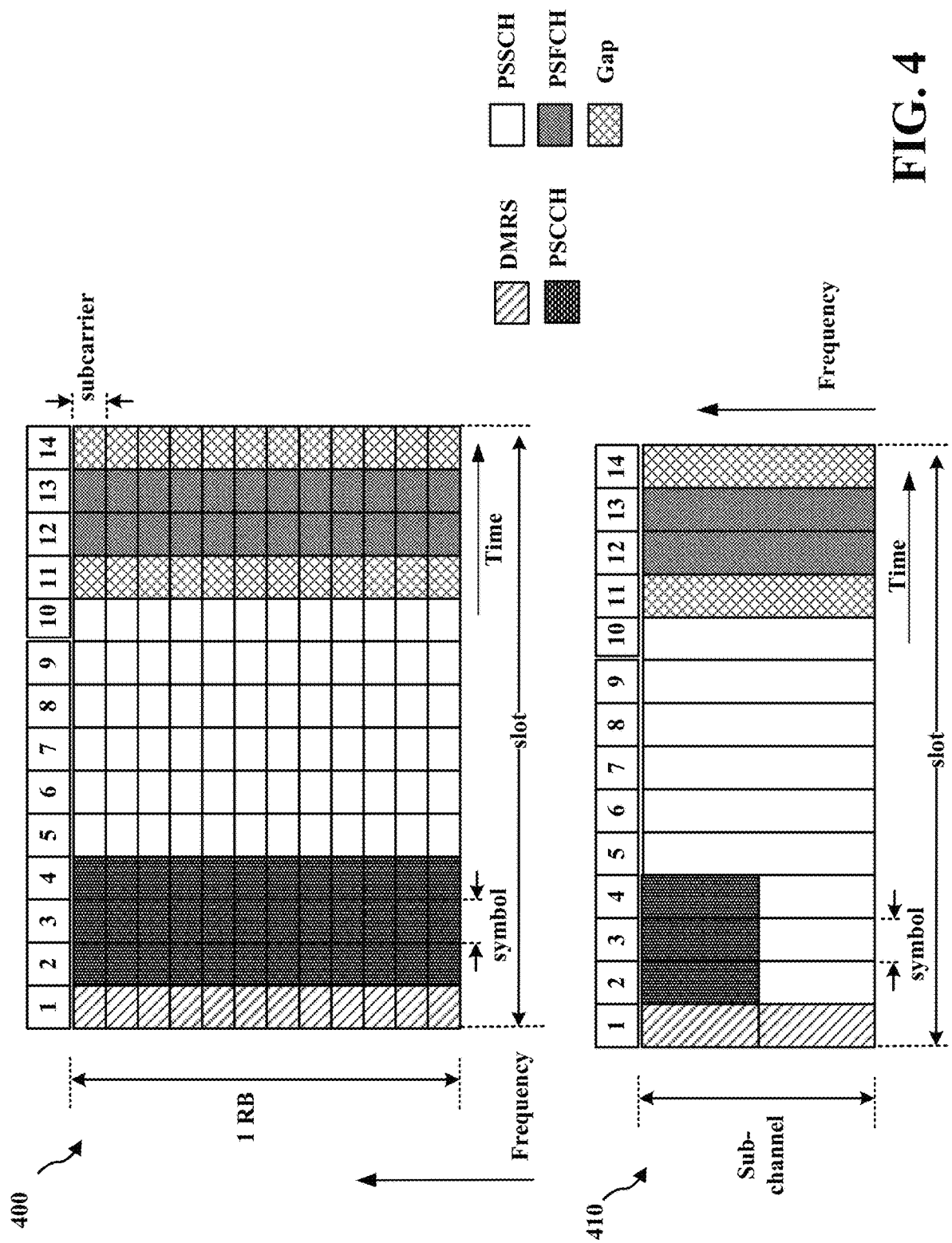
FIG. 4 illustrates example aspects of slot structures that may be used for sidelink communication.

FIG. 4 includes diagrams 400 and 410 illustrating example aspects of slot structures that may be used for sidelink communication (e.g., between UEs 104, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 4 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 400 illustrates a single resource block of a single slot transmission, e.g., which may correspond to a 0.5 ms transmission time interval (TTI). A PSCCH may be configured to occupy multiple PRBs, e.g., 10, 12, 15, 20, or 25 PRBs. The PSCCH may be limited to a single subchannel. A PSCCH duration may be configured to be 2 symbols or 3 symbols, for example. A sub-channel may include 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 410 in FIG. 4 illustrates an example in which the PSCCH occupies about 50% of a subchannel, as one example to illustrate the concept of PSCCH occupying a portion of a subchannel. The PSSCH occupies at least one subchannel. The PSCCH may include a first portion of sidelink control information (SCI), and the PSSCH may include a second portion of SCI in some examples.

As illustrated in FIG. 4, some of the REs may include control information in PSCCH and some REs may include demodulation RS (DMRS). At least one symbol may be used for feedback. FIG. 4 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or listen before transmit (LBT) symbols may be different than the example illustrated in FIG. 4. Multiple slots may be aggregated together in some aspects.

Sidelink communication may be based on different types or modes of resource allocation mechanisms. In a first resource allocation mode (which may be referred to herein as "Mode 1"), centralized resource allocation may be provided by a network entity. For example, a base station 102 or 180 may determine resources for sidelink communication and may allocate resources to different UEs 104 to use for sidelink transmissions. In this first mode, a UE receives the allocation of sidelink resources from the base station 102 or 180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink may determine one or more radio resources in the time and frequency domain that are used by other devices, in order to select transmission resources that avoid collisions with other devices. The sidelink transmission and/or the resource reservation may be periodic or aperiodic, where a UE may reserve resources for transmission in a current slot and up to two future retransmissions using the SCI.

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding SCI transmitted by other UEs. The UE may use a sensing-based resource selection algorithm to estimate or determine which radio resources are in-use and/or reserved by others. The UE may receive SCI from another UE that includes reservation information based on a resource reservation field included in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., subchannels per subframe) reserved by the UE may depend on the size of data to be transmitted by the UE. Although the example is described for a UE receiving reservations from another UE, the reservations may also be received from a roadside unit (RSU) or other device communicating based on sidelink.

An SCI message may be provided in a first stage and a second stage. The first stage may be referred to as SCI-1 and the second stage may be referred to as SCI-2. SCI-1 may be transmitted via a PSCCH, and may include resource allocation information and information for decoding the SCI-2 (e.g., a format of SCI-2 and/or other information). The resource allocation information may indicate resources for the SCI-2 and/or a PSSCH. In one configuration, the SCI-2 may be transmitted via a PSSCH. The SCI-2 may include information for decoding the data portion of the PSSCH. In some aspects, SCI-2 may be mapped to contiguous RBs in the PSSCH, starting from a first symbol with a PSSCH DMRS. In some aspects, the SCI-2 may be scrambled separately from the data portion of the PSSCH.

Figure 5:
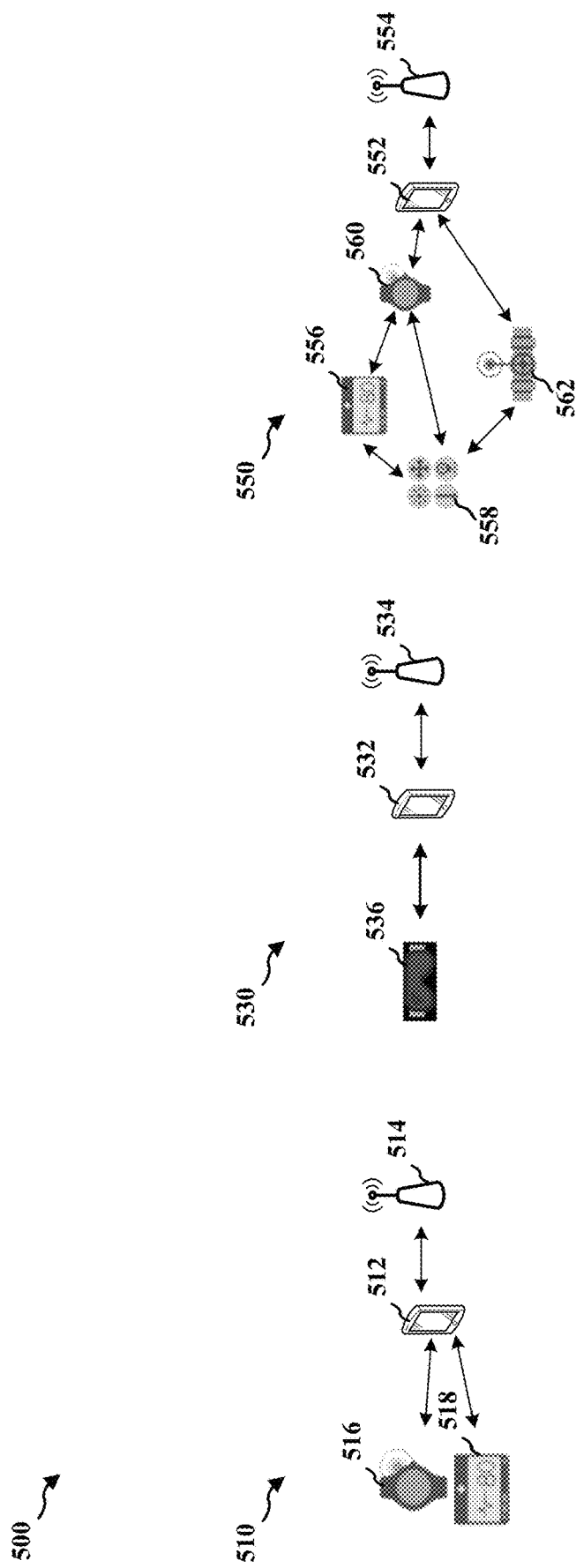
FIG. 5 is a diagram illustrating various examples of UE-to-network relaying.

FIG. 5 is a diagram 500 illustrating various examples of UE-to-network relaying. In diagram 510, a first UE 512 may communicate via sidelinks with at least one of a second UE 516 (e.g., a smart watch) or a third UE 518 (e.g., a health monitoring device). The second UE 516 and/or the third UE 518 may or may not have cellular communication (e.g., 5G NR, LTE, etc.) capability. Further, the first UE 512 may communicate with a base station 514 (e.g., via a Uu connection). Accordingly, the first UE 512 may operate as a relay device, and the base station 514 may communicate, via the first UE 512 as the relay device, with one or both of the second UE 516 or the third UE. In diagram 530, a first UE 532 may communicate via a sidelink with a second UE 536 (e.g., an extended reality (XR) head-mounted display), and may communicate with a base station 534 (e.g., via a Uu connection). Accordingly, the first UE 532 may operate as a relay device between the second UE 536 and the base station 534. The second UE 536 may communicate, via the first UE 532 as a relay device, with the base station 534.

In diagram 550, a first UE 552 may communicate via sidelinks with one or more of a second UE 556 (e.g., a sensor such as a health monitoring device), a third UE 558 (e.g., a sensor such a smart thermostat), a fourth UE 560 (e.g., a smart watch), or a fifth UE 562 (e.g., a smart entry key). Further, the first UE 552 may communicate with a base station 554 (e.g., via a Uu connection). Accordingly, the first UE 552 may operate as a relay device between the base station 554 and any UE in the second UE through the fifth UE 556-562. Therefore, one or more of the second UE 556 through the fifth UE 562 may communicate, via the first UE 552 as a relay device, with the base station 554. Furthermore, the first UE 552, the second UE 556, the third UE 558, the fourth UE 560, and the fifth UE 562 may be connected with each other via sidelinks with a mesh topology. Therefore, these UEs 552 and 556-562 may communicate with each other over the sidelinks. Moreover, in some examples, communication between two UEs in UEs 552 and 556-562 may be via one or more other UEs in UEs 552 and 556-562 operating as sidelink relay devices. For example, the second UE 556 and the fifth UE 562 may communicate with each other via the third UE 558 as a sidelink relay device. Further, in some configurations, multi-hop relaying may be possible.

Figures 6A, 6B:
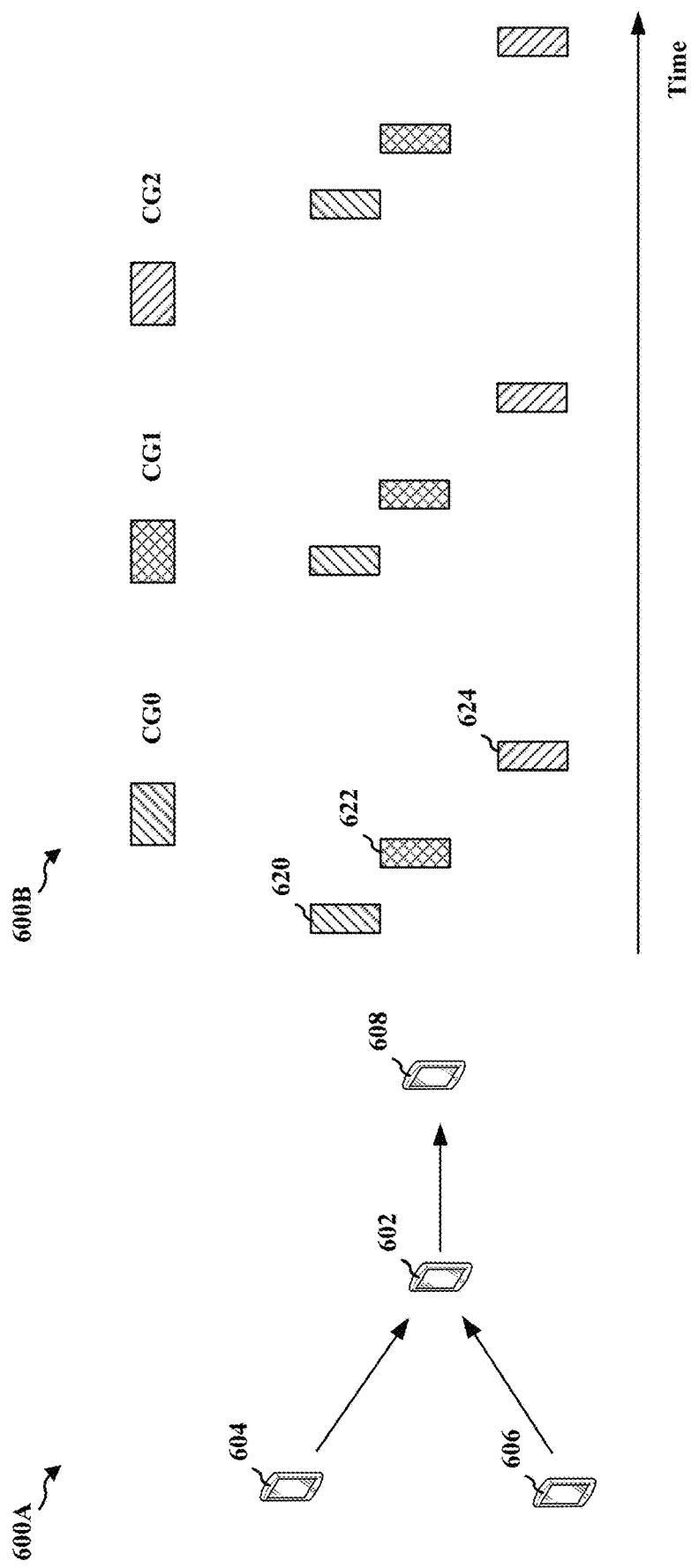
FIG. 6A is a diagram illustrating an example environment.
FIG. 6B is a diagram illustrating example configured grants for sidelink transmissions associated with example UEs.

FIG. 6A is a diagram illustrating an example environment 600A. In some examples, a UE may maintain (e.g., store temporarily) for sidelink relaying (forwarding) two or more transport blocks (TBs) at the same time. In one or more configurations, when the UE has the next transmission opportunity to send a sidelink transmission to the next hop receiver (which may be the destination or a further relay), the UE may perform various operations in order to relay the two or more TBs that have been maintained by the UE. For example, in FIG. 6A, a first UE 602 may receive a first TB from a second UE 604 for forwarding, and may receive a second TB from a third UE 606 for forwarding. The first UE 602 may maintain the first TB and the second TB before the first UE 602 has the next transmission opportunity to send a sidelink transmission. In FIG. 6A, a fourth UE 608 may be the next hop receiver.

In one or more configurations, the two or more TBs maintained by the first UE 602 may be associated with a same priority, or may be associated with different priorities. In one or more configurations, once the first UE 602 has decided on the configurations for relaying the two or more TBs, the first UE 602 may transmit the SCI (e.g., to reserve resources).

To relay the two or more TBs, in some configurations, the first UE 602 may perform amplify-and-forward (AF) relaying. The first UE 602 may further perform digital processing in addition to the AF relaying. In some other configurations, the first UE 602 may perform decode-and-forward (DF) relaying in order to relay the two or more TBs.

If DF relaying is utilized, and the two or more TBs are forwarded to the same RX-UE, one or more aspects may relate to PHY layer prioritization for TB relaying. In some examples, a UE may multiplex the two or more TBs in the MAC layer when forwarding the TBs to a same RX-UE. In one or more aspects, the UE may multiplex the two or more TBs in the PHY layer, and may prioritize some TBs over others when forwarding the TBs.

In one configuration, a UE may use AF relaying to forward two or more TBs to a same RX-UE, where the UE may multiplex the two or more TBs in the PHY layer. In another configuration, a UE may use AF relaying to forward two or more TBs to different RX-UEs, where the UE may multiplex the two or more TBs in the PHY layer. In yet another configuration, a UE may use DF relaying to forward two or more TBs to a same RX-UE, where the UE may multiplex the two or more TBs in the PHY layer. In still another configuration, a UE may use DF relaying to forward two or more TBs to different RX-UEs, where the UE may multiplex the two or more TBs in the PHY layer.

FIG. 6B is a diagram 600B illustrating example configured grants for sidelink transmissions associated with example UEs. FIG. 6B illustrates the timing of three configured grants: the configured grant 0 (CG0), the configured grant 1 (CG1), and the configured grant (CG2). Each of CG0, CG1, or CG2 may be a type 1 or a type 2 configured grant in the sidelink. In some examples, CG0 may be based on semi-persistent scheduling (SPS), and may be associated with a first periodicity. The second UE 604 in FIG. 6A may use CG0 to send sidelink transmissions to the first UE 602. Further, CG1 may be based on another SPS, and may be associated with a second periodicity. The third UE 606 in FIG. 6A may use CG1 to send sidelink transmissions to the first UE 602. Moreover, CG2 may be based on yet another SPS, and may be associated with a third periodicity. The first UE 602 in FIG. 6A may use CG2 to send sidelink transmissions to the fourth UE 608.

Therefore, at 620, the second UE 604 may transmit the first TB to the first UE 602 via a sidelink based on CG0. Further, at 622, the third UE 606 may transmit the second TB to the first UE 602 via a sidelink based on CG1. Accordingly, between 622 and 624, the first UE 602 may maintain both the first TB and the second TB for relaying. Thereafter, at 624, the first UE 602 may use AF relaying or DF relaying to forward at least one of the first TB or the second TB to the fourth UE 608 via a sidelink based on CG2.

Figure 7:
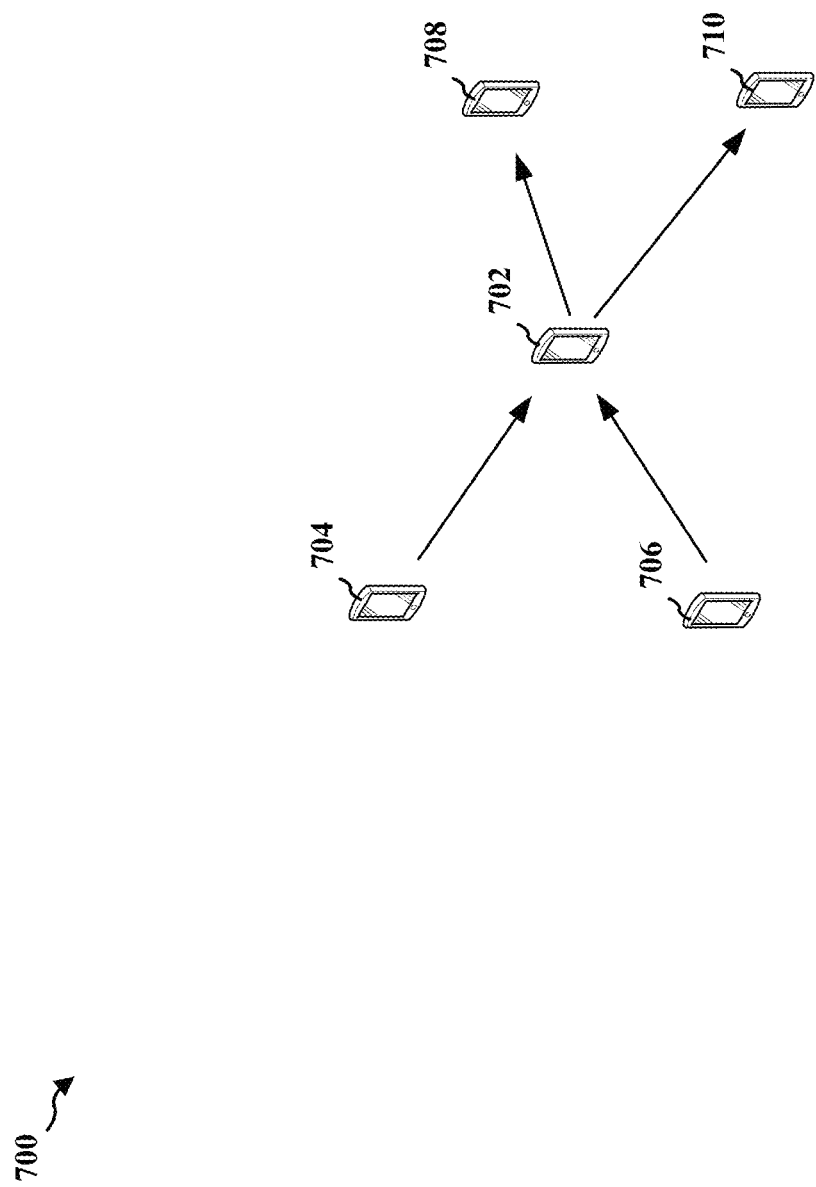
FIG. 7 is a diagram illustrating an example environment according to one or more aspects.

FIG. 7 is a diagram illustrating an example environment 700 according to one or more aspects. A first UE 702 may receive a first TB and a second TB for relaying from at least one of a second UE 704 or a third UE 706. In some examples, the first TB and the second TB may be received from a same UE between the second UE 704 and the third UE 706. In some other examples, the first TB and the second TB may each be received from one respective UE between the second UE 704 and the third UE 706.

In one or more configurations, the first UE 702 may use DF relaying or AF relaying to forward the first TB and the second TB to at least one of a fourth UE 708 or a fifth UE 710. In some examples, the first TB and the second TB may be forwarded to a same UE between the fourth UE 708 and the fifth UE 710. In some other examples, the first TB and the second TB may each be forwarded to one respective UE between the fourth UE 708 and the fifth UE 710.

In some configurations, the first TB may be associated with a first priority, and the second TB may be associated with a second priority.

In one or more configurations, the first priority may be equal to the second priority. In one configuration where the first priority is equal to the second priority, the first UE 702 may forward the first TB and the second TB to at least one of a fourth UE 708 or a fifth UE 710 based on a first-in-first-out (FIFO) rule. In other words, the first UE 702 may forward the first TB and the second TB to at least one of a fourth UE 708 or a fifth UE 710 in the order in which the first TB and the second TB were received at the first UE 702.

In one configuration where the first priority is equal to the second priority, the first UE 702 may forward the first TB and the second TB to at least one of a fourth UE 708 or a fifth UE 710 using multiplexing such as time division multiplexing (TDM), frequency division multiplexing (FDM), or spatial division multiplexing (SDM) (e.g., transmitting the first TB and the second TB using different spatial beams).

In one or more configurations where SDM is used, the first UE 702 may forward the first TB and the second TB on a same antenna port or on different antenna ports. In one or more configurations, if the first UE 702 forwards the first TB and the second TB on a same antenna port, the first UE 702 may use a non-orthogonal multiple access (NOMA) transmission technique to transmit two signals corresponding to the two TBs. In one configuration, the two signals may be separated based on power control information. For example, the first UE 702 may send the two signals with different configured power levels, such that the two signals may be separated based on the power levels.

In one configuration where the first priority is equal to the second priority and TDM or SDM is utilized, the first UE 702 may transmit (e.g., broadcast) an SCI-1 message that may indicate the total resources to be used for the forwarding of the first TB and the second TB. Further, the first UE 702 may transmit (e.g., broadcast) an SCI-2 message that may indicate first resources to be used for forwarding the first TB and second resources to be used for forwarding the second TB.

In one configuration where the first priority is equal to the second priority and TDM or SDM is utilized, the first UE 702 may transmit (e.g., broadcast) a first SCI-1 message that may indicate first resources to be used for forwarding the first TB, and may transmit (e.g., broadcast) a second SCI-1 message that may indicate second resources to be used for forwarding the second TB.

In one or more configurations, the first priority may not be equal to the second priority. In one configuration where the first priority is not equal to the second priority, the first UE 702 may forward the TB between the first TB and the second TB that is associated with the greater (higher) priority before forwarding the other TB between the first TB and the second TB that is associated with the lesser (lower) priority.

In one configuration where the first priority is not equal to the second priority, the first UE 702 may first assign resources (e.g., third resources) to the forwarding of the TB between the first TB and the second TB that is associated with the greater priority before assigning resources (e.g., fourth resources) to the forwarding of the other TB between the first TB and the second TB that is associated with the lesser priority. Therefore, the available resources may first be assigned to the forwarding of the TB between the first TB and the second TB that is associated with the greater priority. Any remaining available resources may be assigned to the forwarding of the other TB between the first TB and the second TB that is associated with the lesser priority. Then, the first UE 702 may forward the first TB and the second TB based on the resource assignment without further regard to the priorities of the first TB or the second TB.

FIG. 8 illustrates example resource allocations for forwarding two TBs and example SCI designs. In FIG. 8, Y may represent the total number of symbols used for the forwarding of the first TB and the second TB. The value of Y may be configured for a resource pool. Further, X may be the number of symbols used by the corresponding source UE (e.g., the second UE 704 or the third UE 706) to transmit the TB associated with the higher priority to the first UE 702. Accordingly, Y-X may be the number of symbols used by the corresponding source UE (e.g., the second UE 704 or the third UE 706) to transmit the TB associated with the lower priority to the first UE 702. In some examples, when forwarding the two TBs, the first UE 702 may use AF relaying, and may use the same number of symbols (e.g., X symbols and Y-X symbols) to forward the two TBs. In some examples, if the amount of resources in the resource pool is insufficient (e.g., if the resource pool corresponds to no more than X symbols x 1 sub-channel), the UE 702 may forward the higher priority TB at one transmission opportunity, and may wait until the next transmission opportunity to forward the lower priority TB.

In diagram 800, the first UE 702 may transmit (e.g., broadcast) a common SCI-1 message 806 (e.g., via a PSCCH) that may indicate all resources (e.g., 802 and 804) used for forwarding both the first TB and the second TB. Further, the UE 702 may transmit an SCI-2 message (not shown) (e.g., via a PSSCH) that may indicate further information about resource allocation for forwarding the two TBs. For example, the SCI-2 message may indicate third resources 802 (e.g., X symbols) assigned to the forwarding of the higher priority TB and fourth resources 804 (e.g., Y-X symbols) assigned to the forwarding of the lower priority TB. In particular, the values of X and Y may be signaled by the first UE 702 to the respective RX-UE (e.g., the fourth UE 708 or the fifth UE 710). If the two TBs are to be forwarded to the same RX-UE (e.g., the fourth UE 708 or the fifth UE 710), the values of X and Y may be signaled by the first UE 702 to that RX-UE.

In diagram 850, the first UE 702 may transmit (e.g., broadcast) a first SCI-1 message 856 (e.g., via a PSCCH) that may indicate third resources 852 assigned to the forwarding of the higher priority TB, and may transmit (e.g., broadcast) a second SCI-1 message 858 (e.g., via a PSCCH) that may indicate fourth resources 854 assigned to the forwarding of the lower priority TB. Accordingly, the first UE 702 may signal via the SCI-1 messages the time domain resource allocation (e.g., the number of PSSCH symbols) associated with the forwarding of each of the two TBs.

In some configurations, X and Y may be defined and configured in a different fashion. In particular, X and Y may be configured based on an RRC message from a base station. The configuration may be for all resource pools, or may be for one or more particular resource pools. In some examples, a TB to be forwarded may be associated with fewer PSSCH symbols than the number of PSSCH symbols made available based on the base station configured X and Y values. Accordingly, in one configuration, the first UE 702 may leave the excess PSSCH symbols unused when forwarding the TB. In another configuration, the first UE may repeat some of the symbols of the TB being forwarded in the excess PSSCH symbols when forwarding the TB. In some examples, the first UE 702 may select the location of the PSSCH symbols that are unused or correspond to a repetition.

In one configuration where the first priority is not equal to the second priority, the first UE 702 may first assign up to a predetermined amount of resources (e.g., up to a predetermined number of symbols x a fixed number of sub-channels) (e.g., third resources) in a resource pool to the forwarding of the TB between the first TB and the second TB that is associated with the greater priority before assigning remaining resources (e.g., fourth resources) in the resource pool to the forwarding of the other TB between the first TB and the second TB that is associated with the lesser priority. Then, the first UE 702 may forward the first TB and the second TB based on the resource assignment without further regard to the priorities of the first TB or the second TB.

A UE (e.g., the first UE 702) may not be capable of maintaining and forwarding an unlimited number of TBs at the same time. Accordingly, a UE may report, to another UE via a sidelink, a capability that may correspond to a maximum number of TBs that the UE may maintain and forward at the same time.

Figure 9:
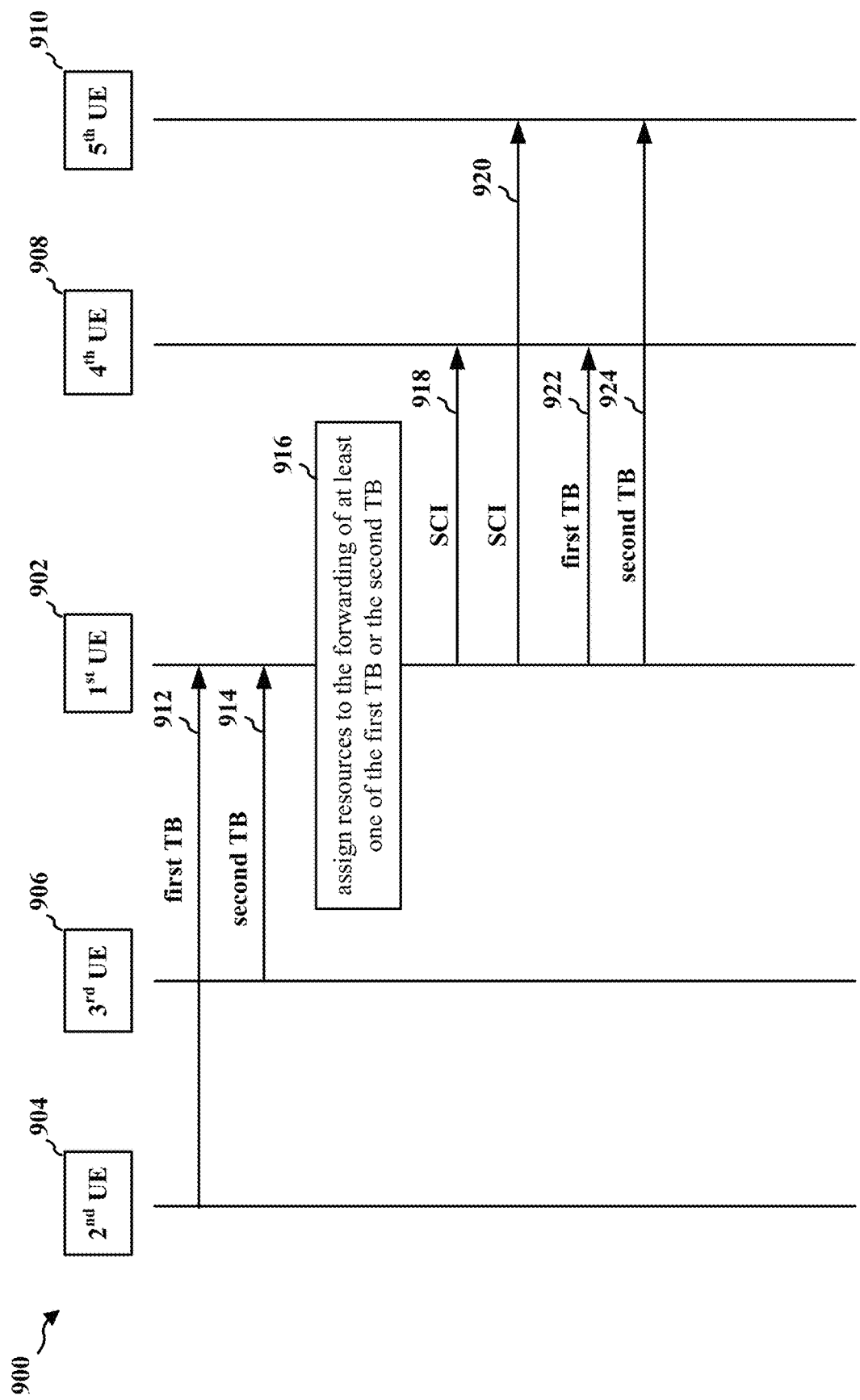
FIG. 9 is a diagram of a communication flow of a method of wireless communication.

FIG. 9 is a diagram of a communication flow 900 of a method of wireless communication. The first UE 902 may correspond to the UE 104/350/556-562/602/702. Either of the second UE 904 or the third UE 906 may correspond to any of the UE 552 (as appropriate)/556-562 (as appropriate)/ 604/606/704/706. Therefore, in some examples, the second UE 904 and the third UE 906 may be a same UE. Further, either of the fourth UE 908 or the fifth UE 910 may correspond to any of the UE 552 (as appropriate)/556-562 (as appropriate)/608/708/710. Therefore, in some examples, the fourth UE 908 and the fifth UE 910 may be a same UE. At 912, the first UE 902 may receive, from a second UE 904 via a first sidelink, a first TB. At 914, the first UE 902 may receive, from a third UE 906 via a second sidelink, a second TB. At 916, the first UE 902 may assign resources associated with a resource pool to the forwarding of at least one of the first TB or the second TB.

In some configurations, at 918 and/or 920, the first UE 902 may transmit, to at least one of the fourth UE 908 or the fifth UE 910, an SCI-1 message and an SCI-2 message. In some additional configurations, at 918 and/or 920, the first UE 902 may transmit, to at least one of the fourth UE 908 or the fifth UE 910, a first SCI-1 message and a second SCI-1 message.

At 922 and 924, the first UE 902 may forward the first TB to a fourth UE 908 and the second TB to a fifth UE 910 via physical layer multiplexing over a third sidelink and a fourth sidelink, respectively, based on the first priority and the second priority.

Figure 10:
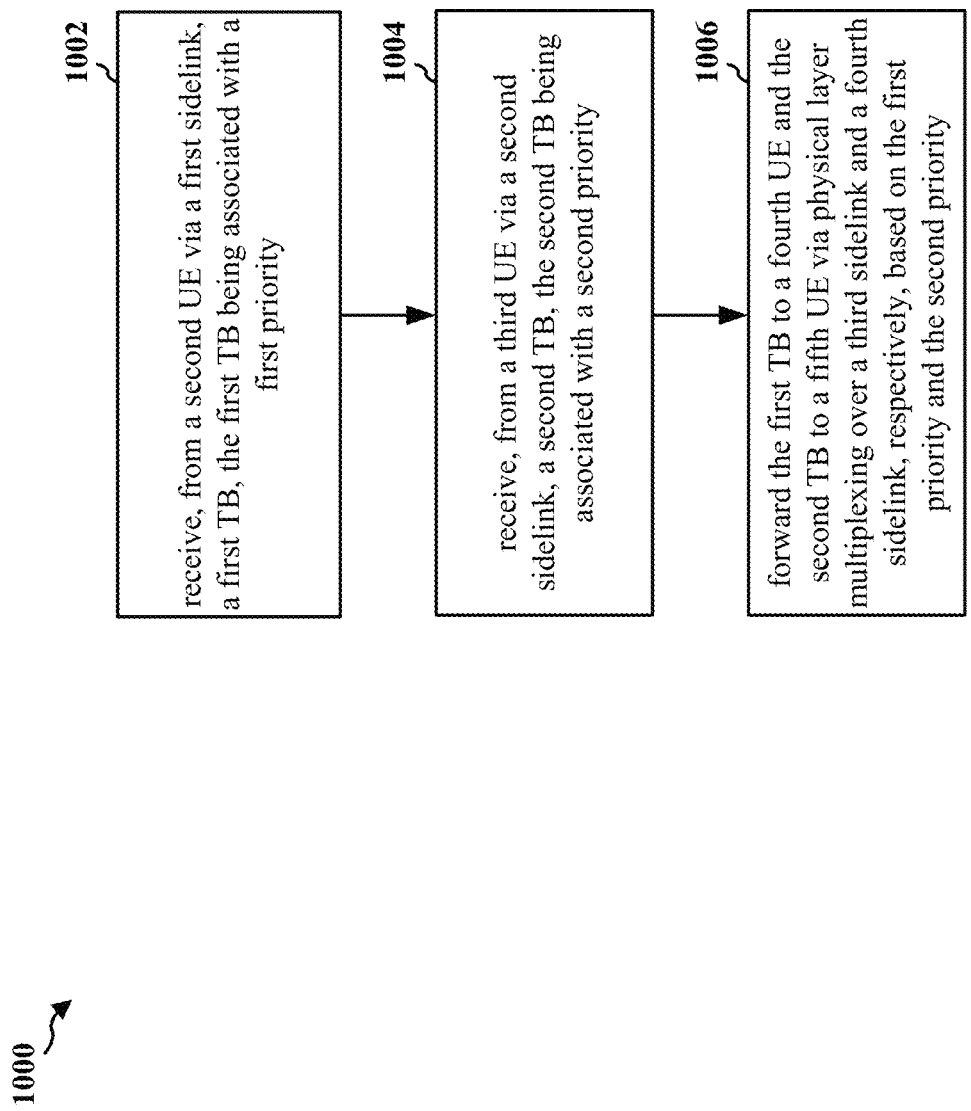
FIG. 10 is a flowchart of a method of wireless communication.

FIG. 10 is a flowchart 1000 of a method of wireless communication. The method may be performed by a first UE (e.g., the first UE 104/350/556-562/602/702/902; the apparatus 1102). At 1002, the first UE may receive, from a second UE via a first sidelink, a first TB. The first TB may be associated with a first priority. For example, 1002 may be performed by the sidelink forwarding component 1140 in FIG. 11. Referring to FIG. 9, at 912, the first UE 902 may receive, from a second UE 904 via a first sidelink, a first TB.

At 1004, the first UE may receive, from a third UE via a second sidelink, a second TB. The second TB may be associated with a second priority. For example, 1004 may be performed by the sidelink forwarding component 1140 in FIG. 11. Referring to FIG. 9, at 914, the first UE 902 may receive, from a third UE 906 via a second sidelink, a second TB.

At 1006, the first UE may forward the first TB to a fourth UE and the second TB to a fifth UE via physical layer multiplexing over a third sidelink and a fourth sidelink, respectively, based on the first priority and the second priority. For example, 1006 may be performed by the sidelink forwarding component 1140 in FIG. 11. Referring to FIG. 9, at 922 and 924, the first UE 902 may forward the first TB to a fourth UE 908 and the second TB to a fifth UE 910 via physical layer multiplexing over a third sidelink and a fourth sidelink, respectively, based on the first priority and the second priority.

In one configuration, referring to FIG. 9, to forward the first TB to the fourth UE 908 and the second TB to the fifth UE 910, the first UE 902 may perform an AF operation or a DF operation.

In one configuration, the first sidelink, the second sidelink, the third sidelink, and the fourth sidelink may each be associated with a configured grant based on SPS.

In one configuration, the first priority may be equal to the second priority.

In one configuration, referring to FIG. 9, the first TB and the second TB may be forwarded at 922 and 924 based on an order in which the first TB and the second TB are received at 912 and 914 and a FIFO policy.

In one configuration, the first TB and the second TB may be forwarded based on TDM or FDM.

In one configuration, referring to FIG. 9, at 918 and/or 920, the first UE 902 may transmit, to at least one of the fourth UE 908 or the fifth UE 910, an SCI-1 message and an SCI-2 message. The SCI-1 message may include an indication of total resources associated with forwarding the first TB and the second TB. The SCI-2 message may include an indication of first resources associated with forwarding the first TB and an indication of second resources associated with forwarding the second TB.

In one configuration, referring to FIG. 9, at 918 and/or 920, the first UE 902 may transmit, to at least one of the fourth UE 908 or the fifth UE 910, a first SCI-1 message and a second SCI-1 message. The first SCI-1 message may include an indication of first resources associated with forwarding the first TB. The second SCI-1 message may include an indication of second resources associated with forwarding the second TB.

In one configuration, referring to FIG. 9, the first TB and the second TB may be forwarded at 922 and 924 based on SDM. In one configuration, the first TB and the second TB may be forwarded on a same antenna port or on different antenna ports. In one configuration, the first TB and the second TB may be forwarded on a same antenna port via two respective signals based on a NOMA transmission technique. In one configuration, the two signals may be separated based on power control information. In one configuration, the first UE may send the two signals with different configured power levels, such that the two signals may be separated based on the power levels.

In one configuration, the first priority may not be equal to the second priority.

In one configuration, referring to FIG. 9, one of the first TB or the second TB associated with a greater priority between the first priority and the second priority may be forwarded at 922 and 924 before the other of the first TB or the second TB.

In one configuration, referring to FIG. 9, at 916, the first UE 902 may assign third resources from available resources in at least one resource pool to the forwarding of one of the first TB or the second TB associated with a greater priority between the first priority and the second priority before assigning fourth resources from remaining resources in the at least one resource pool to the forwarding of the other of the first TB or the second TB.

In one configuration, referring to FIG. 9, at 918 and/or 920, the first UE 902 may transmit, to at least one of the fourth UE 908 or the fifth UE 910, an SCI-1 message and an SCI-2 message. The SCI-1 message may include an indication of total resources associated with forwarding the first TB and the second TB. The SCI-2 message may include an indication of the third resources and an indication of the fourth resources.

In one configuration, referring to FIG. 9, at 918 and/or 920, the first UE 902 may transmit, to at least one of the fourth UE 908 or the fifth UE 910, a first SCI-1 message and a second SCI-1 message. The first SCI-1 message may include an indication of the third resources. The second SCI-1 message may include an indication of the fourth resources.

In one configuration, referring to FIG. 9, the first UE 902 may receive, from a base station via an RRC message, an indication of third resources assigned to the forwarding of one of the first TB or the second TB associated with a greater priority between the first priority and the second priority and an indication of fourth resources assigned to the forwarding of the other of the first TB or the second TB. The third resources and the fourth resources may be from at least one resource pool.

In one configuration, at least one symbol in the third resources or the fourth resources is an unused symbol or a repetition symbol.

In one configuration, referring to FIG. 9, at 916, the first UE 902 may assign a predefined amount of resources from available resources in at least one resource pool to the forwarding of one of the first TB or the second TB associated with a greater priority between the first priority and the second priority. The first UE 902 may assign, if there are any remaining resources in the at least one resource pool after the assigning of the predefined amount of resources, fourth resources from the remaining resources to the forwarding of the other of the first TB or the second TB.

In one configuration, referring to FIG. 9, the first UE 902 may transmit, to a sixth UE, an indication of a limit on a number of TBs that the first UE 902 may forward at a time.

Figure 11:
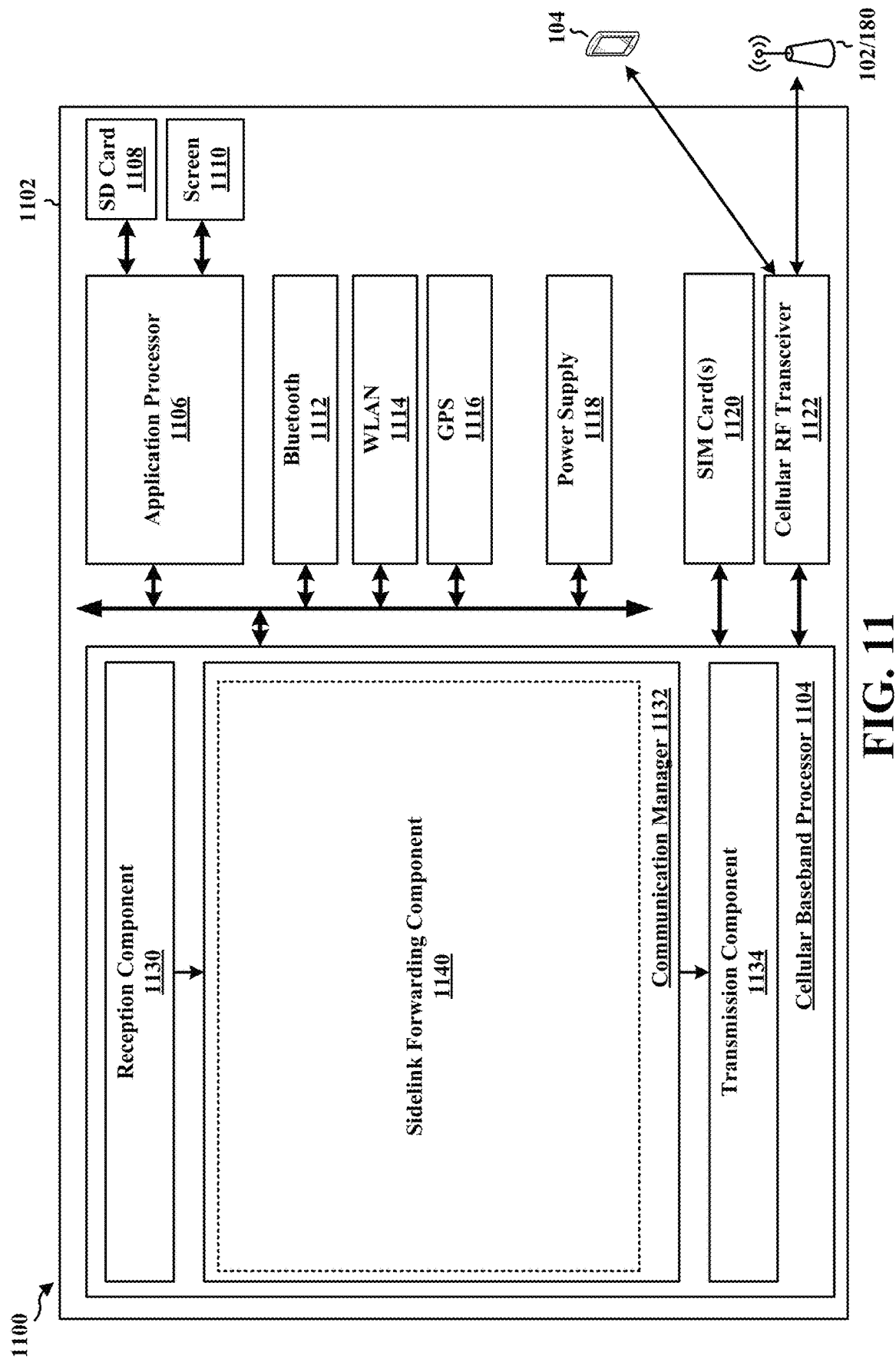
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 includes a sidelink forwarding component 1140 that may be configured to receive, from a second UE via a first sidelink, a first TB, e.g., as described in connection with 1002 in FIG. 10. The sidelink forwarding component 1140 may be configured to receive, from a third UE via a second sidelink, a second TB, e.g., as described in connection with 1004 in FIG. 10. The sidelink forwarding component 1140 may be configured to forward the first TB to a fourth UE and the second TB to a fifth UE via physical layer multiplexing over a third sidelink and a fourth sidelink, respectively, based on the first priority and the second priority, e.g., as described in connection with 1006 in FIG. 10.

The apparatus may include additional components that perform each of the blocks of the algorithm in the flowcharts of FIGS. 9 and 10. As such, each block in the flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for receiving, from a second UE via a first sidelink, a first TB. The first TB may be associated with a first priority. The apparatus 1102, and in particular the cellular baseband processor 1104, includes means for receiving, from a third UE via a second sidelink, a second TB. The second TB may be associated with a second priority. The apparatus 1102, and in particular the cellular baseband processor 1104, includes means for forwarding the first TB to a fourth UE and the second TB to a fifth UE via physical layer multiplexing over a third sidelink and a fourth sidelink, respectively, based on the first priority and the second priority.

In one configuration, to forward the first TB to the fourth UE and the second TB to the fifth UE, the apparatus 1102, and in particular the cellular baseband processor 1104, includes means for performing an AF operation or a DF operation. In one configuration, the first sidelink, the second sidelink, the third sidelink, and the fourth sidelink may each be associated with a configured grant based on SPS. In one configuration, the first priority may be equal to the second priority. In one configuration, the first TB and the second TB may be forwarded based on an order in which the first TB and the second TB are received and a FIFO policy. In one configuration, the first TB and the second TB may be forwarded based on TDM or FDM. In one configuration, the apparatus 1102, and in particular the cellular baseband processor 1104, includes means for transmitting, to at least one of the fourth UE or the fifth UE, an SCI-1 message and an SCI-2 message. The SCI-1 message may include an indication of total resources associated with forwarding the first TB and the second TB. The SCI-2 message may include an indication of first resources associated with forwarding the first TB and an indication of second resources associated with forwarding the second TB. In one configuration, the apparatus 1102, and in particular the cellular baseband processor 1104, includes means for transmitting, to at least one of the fourth UE or the fifth UE, a first SCI-1 message and a second SCI-1 message. The first SCI-1 message may include an indication of first resources associated with forwarding the first TB. The second SCI-1 message may include an indication of second resources associated with forwarding the second TB. In one configuration, the first TB and the second TB may be forwarded based on SDM. In one configuration, the first priority may not be equal to the second priority. In one configuration, one of the first TB or the second TB associated with a greater priority between the first priority and the second priority may be forwarded before the other of the first TB or the second TB. In one configuration, the apparatus 1102, and in particular the cellular baseband processor 1104, includes means for assigning third resources from available resources in at least one resource pool to the forwarding of one of the first TB or the second TB associated with a greater priority between the first priority and the second priority before assigning fourth resources from remaining resources in the at least one resource pool to the forwarding of the other of the first TB or the second TB. In one configuration, the apparatus 1102, and in particular the cellular baseband processor 1104, includes means for transmitting, to at least one of the fourth UE or the fifth UE, an SCI-1 message and an SCI-2 message. The SCI-1 message may include an indication of total resources associated with forwarding the first TB and the second TB. The SCI-2 message may include an indication of the third resources and an indication of the fourth resources. In one configuration, the apparatus 1102, and in particular the cellular baseband processor 1104, includes means for transmitting, to at least one of the fourth UE or the fifth UE, a first SCI-1 message and a second SCI-1 message. The first SCI-1 message may include an indication of the third resources. The second SCI-1 message may include an indication of the fourth resources. In one configuration, the apparatus 1102, and in particular the cellular baseband processor 1104, includes means for receiving, from a base station via an RRC message, an indication of third resources assigned to the forwarding of one of the first TB or the second TB associated with a greater priority between the first priority and the second priority and an indication of fourth resources assigned to the forwarding of the other of the first TB or the second TB. The third resources and the fourth resources may be from at least one resource pool. In one configuration, at least one symbol in the third resources or the fourth resources is an unused symbol or a repetition symbol. In one configuration, the apparatus 1102, and in particular the cellular baseband processor 1104, includes means for assigning a predefined amount of resources from available resources in at least one resource pool to the forwarding of one of the first TB or the second TB associated with a greater priority between the first priority and the second priority. The apparatus 1102, and in particular the cellular baseband processor 1104, includes means for assigning, if there are any remaining resources in the at least one resource pool after the assigning of the predefined amount of resources, fourth resources from the remaining resources to the forwarding of the other of the first TB or the second TB. In one configuration, the apparatus 1102, and in particular the cellular baseband processor 1104, includes means for transmitting, to a sixth UE, an indication of a limit on a number of TBs that the apparatus 1102 may forward at a time.

The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Referring back to FIGS. 4-11, a first UE may receive, from a second UE via a first sidelink, a first TB. The first TB may be associated with a first priority. The first UE may receive, from a third UE via a second sidelink, a second TB. The second TB may be associated with a second priority. The first UE may forward the first TB to a fourth UE and the second TB to a fifth UE via physical layer multiplexing over a third sidelink and a fourth sidelink, respectively, based on the first priority and the second priority. Accordingly, a UE may maintain and relay multiple TBs to one or more other UEs via sidelinks at the same time while taking into consideration the priorities associated with the TBs.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to receive, from a second UE via a first sidelink, a first TB, the first TB being associated with a first priority;

receive, from a third UE via a second sidelink, a second TB, the second TB being associated with a second priority; and forward the first TB to a fourth UE and the second TB to a fifth UE via physical layer multiplexing over a third sidelink and a fourth sidelink, respectively, based on the first priority and the second priority.

Aspect 2 is the apparatus of aspect 1, where to forward the first TB to the fourth UE and the second TB to the fifth UE, the at least one processor is further configured to perform an AF operation or a DF operation.

Aspect 3 is the apparatus of any of aspects 1 and 2, where the first sidelink, the second sidelink, the third sidelink, and the fourth sidelink are each associated with a configured grant based on SPS.

Aspect 4 is the apparatus of any of aspects 1 to 3, where the first priority is equal to the second priority.

Aspect 5 is the apparatus of aspect 4, where the first TB and the second TB are forwarded based on an order in which the first TB and the second TB are received and a FIFO policy.

Aspect 6 is the apparatus of any of aspects 4 and 5, where the first TB and the second TB are forwarded based on TDM or FDM.

Aspect 7 is the apparatus of aspect 6, the at least one processor being further configured to: transmit, to at least one of the fourth UE or the fifth UE, a SCI-1 message and a SCI-2 message, where the SCI-1 message includes an indication of total resources associated with forwarding the first TB and the second TB, and the SCI-2 message includes an indication of first resources associated with forwarding the first TB and an indication of second resources associated with forwarding the second TB.

Aspect 8 is the apparatus of aspect 6, the at least one processor being further configured to: transmit, to at least one of the fourth UE or the fifth UE, a first SCI-1 message and a second SCI-1 message, where the first SCI-1 message includes an indication of first resources associated with forwarding the first TB, and the second SCI-1 message includes an indication of second resources associated with forwarding the second TB.

Aspect 9 is the apparatus of any of aspects 4 to 8, where the first TB and the second TB are forwarded based on SDM.

Aspect 10 is the apparatus of any of aspects 1 to 3, where the first priority is not equal to the second priority.

Aspect 11 is the apparatus of aspect 10, where one of the first TB or the second TB associated with a greater priority between the first priority and the second priority is forwarded before the other of the first TB or the second TB.

Aspect 12 is the apparatus of any of aspects 10 and 11, the at least one processor being further configured to: assign third resources from available resources in at least one resource pool to the forwarding of one of the first TB or the second TB associated with a greater priority between the first priority and the second priority before assigning fourth resources from remaining resources in the at least one resource pool to the forwarding of the other of the first TB or the second TB.

Aspect 13 is the apparatus of aspect 12, the at least one processor being further configured to: transmit, to at least one of the fourth UE or the fifth UE, a SCI-1 message and a SCI-2 message, where the SCI-1 message includes an indication of total resources associated with forwarding the first TB and the second TB, and the SCI-2 message includes an indication of the third resources and an indication of the fourth resources.

Aspect 14 is the apparatus of aspect 12, the at least one processor being further configured to: transmit, to at least one of the fourth UE or the fifth UE, a first SCI-1 message and a second SCI-1 message, where the first SCI-1 message includes an indication of the third resources, and the second SCI-1 message includes an indication of the fourth resources.

Aspect 15 is the apparatus of any of aspects 10 and 11, the at least one processor being further configured to: receive, from a base station via an RRC message, an indication of third resources assigned to the forwarding of one of the first TB or the second TB associated with a greater priority between the first priority and the second priority and an indication of fourth resources assigned to the forwarding of the other of the first TB or the second TB, where the third resources and the fourth resources are from at least one resource pool.

Aspect 16 is the apparatus of aspect 15, where at least one symbol in the third resources or the fourth resources is an unused symbol or a repetition symbol.

Aspect 17 is the apparatus of any of aspects 10 and 11, the at least one processor being further configured to: assign a predefined amount of resources from available resources in at least one resource pool to the forwarding of one of the first TB or the second TB associated with a greater priority between the first priority and the second priority; and assign, if there are any remaining resources in the at least one resource pool after the assigning of the predefined amount of resources, fourth resources from the remaining resources to the forwarding of the other of the first TB or the second TB.

Aspect 18 is the apparatus of any of aspects 1 to 17, the at least one processor being further configured to: transmit, to a sixth UE, an indication of a limit on a number of TBs that the first UE forwards at a time.

Aspect 19 is the apparatus of any of aspects 1 to 18, further including a transceiver coupled to the at least one processor.

Aspect 20 is a method of wireless communication for implementing any of aspects 1 to 19.

Aspect 21 is an apparatus for wireless communication including means for implementing any of aspects 1 to 19.

Aspect 22 is a computer-readable medium storing computer executable code, where the code when executed by a processor causes the processor to implement any of aspects 1 to 19.

What is claimed is:

1. An apparatus for wireless communication at a first user equipment (UE), comprising:
   a memory; and
   at least one processor coupled to the memory and configured to:
      receive, from a second UE via a first sidelink, a first transport block (TB), the first TB being associated with a first priority;
      receive, from a third UE via a second sidelink, a second TB, the second TB being associated with a second priority; and
      forward the first TB to a fourth UE and the second TB to a fifth UE via physical layer multiplexing over a third sidelink and a fourth sidelink, respectively, based on the first priority and the second priority.

2. The apparatus of claim 1, wherein to forward the first TB to the fourth UE and the second TB to the fifth UE, the at least one processor is further configured to perform an amplify-and-forward (AF) operation or a decode-and-forward (DF) operation.

3. The apparatus of claim 1, wherein the first sidelink, the second sidelink, the third sidelink, and the fourth sidelink are each associated with a configured grant based on semi-persistent scheduling (SPS).

4. The apparatus of claim 1, wherein the first priority is equal to the second priority.

5. The apparatus of claim 4, wherein the first TB and the second TB are forwarded based on an order in which the first TB and the second TB are received and a first-in-first-out (FIFO) policy.

6. The apparatus of claim 4, wherein the first TB and the second TB are forwarded based on time division multiplexing (TDM) or frequency division multiplexing (FDM).

7. The apparatus of claim 6, the at least one processor being further configured to:
transmit, to at least one of the fourth UE or the fifth UE, a 1st stage sidelink control information (SCI) (SCI-1) message and a 2nd stage SCI (SCI-2) message, wherein the SCI-1 message includes an indication of total resources associated with forwarding the first TB and the second TB, and the SCI-2 message includes an indication of first resources associated with forwarding the first TB and an indication of second resources associated with forwarding the second TB.

8. The apparatus of claim 6, the at least one processor being further configured to:
transmit, to at least one of the fourth UE or the fifth UE, a first 1st stage sidelink control (SCI-1) message and a second SCI-1 message, wherein the first SCI-1 message includes an indication of first resources associated with forwarding the first TB, and the second SCI-1 message includes an indication of second resources associated with forwarding the second TB.

9. The apparatus of claim 4, wherein the first TB and the second TB are forwarded based on spatial division multiplexing (SDM).

10. The apparatus of claim 1, wherein the first priority is not equal to the second priority.

11. The apparatus of claim 10, wherein one of the first TB or the second TB associated with a greater priority between the first priority and the second priority is forwarded before the other of the first TB or the second TB.

12. The apparatus of claim 10, the at least one processor being further configured to:
assign third resources from available resources in at least one resource pool to the forwarding of one of the first TB or the second TB associated with a greater priority between the first priority and the second priority before assigning fourth resources from remaining resources in the at least one resource pool to the forwarding of the other of the first TB or the second TB.

13. The apparatus of claim 12, the at least one processor being further configured to:
transmit, to at least one of the fourth UE or the fifth UE, a 1st stage sidelink control information (SCI) (SCI-1) message and a 2nd stage SCI (SCI-2) message, wherein the SCI-1 message includes an indication of total resources associated with forwarding the first TB and the second TB, and the SCI-2 message includes an indication of the third resources and an indication of the fourth resources.

14. The apparatus of claim 12, the at least one processor being further configured to:
transmit, to at least one of the fourth UE or the fifth UE, a first 1st stage sidelink control (SCI-1) message and a second SCI-1 message, wherein the first SCI-1 message includes an indication of the third resources, and the second SCI-1 message includes an indication of the fourth resources.

15. The apparatus of claim 10, the at least one processor being further configured to:
receive, from a base station via a radio resource control (RRC) message, an indication of third resources assigned to the forwarding of one of the first TB or the second TB associated with a greater priority between the first priority and the second priority and an indication of fourth resources assigned to the forwarding of the other of the first TB or the second TB, wherein the third resources and the fourth resources are from at least one resource pool.

16. The apparatus of claim 15, wherein at least one symbol in the third resources or the fourth resources is an unused symbol or a repetition symbol.

17. The apparatus of claim 10, the at least one processor being further configured to:
assign a predefined amount of resources from available resources in at least one resource pool to the forwarding of one of the first TB or the second TB associated with a greater priority between the first priority and the second priority; and
assign, if there are any remaining resources in the at least one resource pool after the assigning of the predefined amount of resources, fourth resources from the remaining resources to the forwarding of the other of the first TB or the second TB.

18. The apparatus of claim 1, the at least one processor being further configured to:
transmit, to a sixth UE, an indication of a limit on a number of TBs that the first UE forwards at a time.

19. The apparatus of claim 1, further comprising a transceiver coupled to the at least one processor.

20. A method of wireless communication at a first user equipment (UE), comprising:
receiving, from a second UE via a first sidelink, a first transport block (TB), the first TB being associated with a first priority;
receiving, from a third UE via a second sidelink, a second TB, the second TB being associated with a second priority; and
forwarding the first TB to a fourth UE and the second TB to a fifth UE via physical layer multiplexing over a third sidelink and a fourth sidelink, respectively, based on the first priority and the second priority.

21. The method of claim 20, wherein the forwarding the first TB to the fourth UE and the second TB to the fifth UE further comprises performing an amplify-and-forward (AF) operation or a decode-and-forward (DF) operation.

22. The method of claim 20, wherein the first sidelink, the second sidelink, the third sidelink, and the fourth sidelink are each associated with a configured grant based on semi-persistent scheduling (SPS).

23. The method of claim 20, wherein the first priority is equal to the second priority.

24. The method of claim 23, wherein the first TB and the second TB are forwarded based on an order in which the first TB and the second TB are received and a first-in-first-out (FIFO) policy.

25. The method of claim 23, wherein the first TB and the second TB are forwarded based on time division multiplexing (TDM) or frequency division multiplexing (FDM).

26. The method of claim 25, further comprising:
transmitting, to at least one of the fourth UE or the fifth UE, a 1st stage sidelink control information (SCI)

(SCI-1) message and a 2nd stage SCI (SCI-2) message, wherein the SCI-1 message includes an indication of total resources associated with forwarding the first TB and the second TB, and the SCI-2 message includes an indication of first resources associated with forwarding the first TB and an indication of second resources associated with forwarding the second TB.

27. The method of claim 25, further comprising:
transmitting, to at least one of the fourth UE or the fifth UE, a first 1st stage sidelink control (SCI-1) message and a second SCI-1 message, wherein the first SCI-1 message includes an indication of first resources associated with forwarding the first TB, and the second SCI-1 message includes an indication of second resources associated with forwarding the second TB.

28. The method of claim 23, wherein the first TB and the second TB are forwarded based on spatial division multiplexing (SDM).

29. An apparatus for wireless communication at a first user equipment (UE), comprising:
means for receiving, from a second UE via a first sidelink, a first transport block (TB), the first TB being associated with a first priority;
means for receiving, from a third UE via a second sidelink, a second TB, the second TB being associated with a second priority; and
means for forwarding the first TB to a fourth UE and the second TB to a fifth UE via physical layer multiplexing over a third sidelink and a fourth sidelink, respectively, based on the first priority and the second priority.

30. A computer-readable medium storing computer executable code at a first user equipment (UE), the code when executed by a processor causes the processor to:
receive, from a second UE via a first sidelink, a first transport block (TB), the first TB being associated with a first priority;
receive, from a third UE via a second sidelink, a second TB, the second TB being associated with a second priority; and
forward the first TB to a fourth UE and the second TB to a fifth UE via physical layer multiplexing over a third sidelink and a fourth sidelink, respectively, based on the first priority and the second priority.

\* \* \* \* \*